Figures 1, 2, 3:
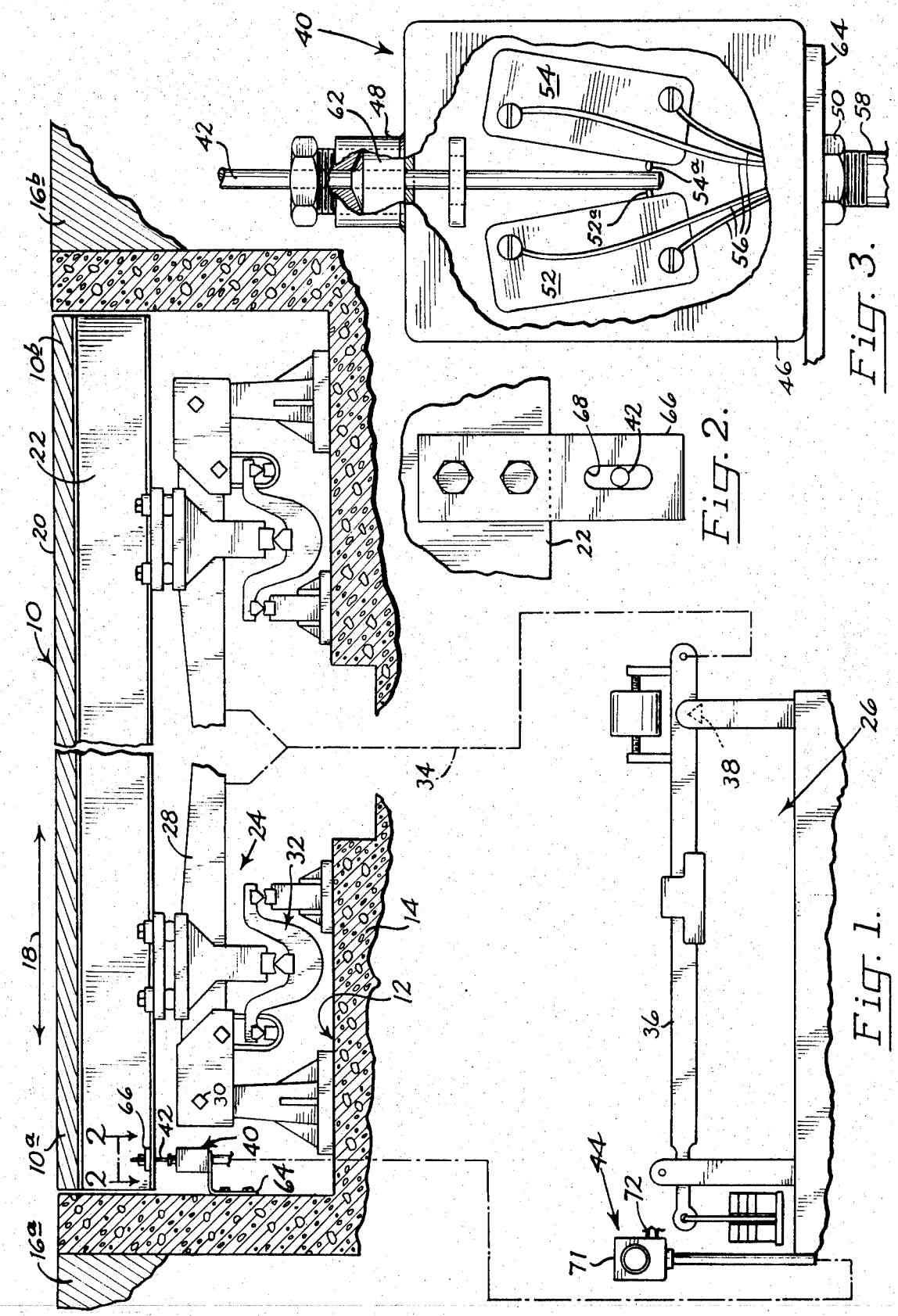

United States Patent

Smith

[15] 3,700,052
[45] Oct. 24, 1972

[54] END SHIFT INDICATOR FOR PLATFORM SCALES

[72] Inventor: William C. Smith, P.O. Box 111, Kent, Oreg. 97033

[22] Filed: Jan. 26, 1972

[21] Appl. No.: 220,919

[52] U.S. Cl. .................. 177/134, 177/255, 340/282
[51] Int. Cl. ............................................. G01g 19/02
[58] Field of Search .............. 177/45, 46, 255, 134; 340/267 R, 282

[56] References Cited

UNITED STATES PATENTS

| | | | |
|---|---|---|---|
| 3,588,867 | 6/1971 | Harris | 340/282 |
| 3,593,263 | 7/1971 | Olsen | 177/134 X |

*Primary Examiner*—Richard B. Wilkinson
*Assistant Examiner*—George H. Miller, Jr.
*Attorney*—M. H. Hartwell, Jr.

[57] ABSTRACT

Vehicle weighing apparatus including a platform positioned to afford driving of a vehicle onto the platform. The platform is supported on lever mechanism which interconnects the platform with the usual weighing scale where vehicle weight is measured. Shifting of the platform in directions extending along the path of movement of a vehicle onto the platform displaces a control rod beneath the platform, and any such displacement is detected by an electrical detecting means including a signaling device.

5 Claims, 3 Drawing Figures

PATENTED OCT 24 1972

3,700,052

END SHIFT INDICATOR FOR PLATFORM SCALES

This invention relates to vehicle weighing apparatus of the type that might be used, for instance, in measuring the weight of trucks or trailers to determine if such come within applicable highway limits.

The usual weighing apparatus includes a platform for supporting the vehicle being weighed, and a lever system or mechanism which interconnects the platform and a weighing scale, whereby the scale gives an indication of the load supported on the platform. The lever system mentioned may take any one of a number of different forms, but in general these comprise a number of interacting levers supported on fulcrums producing an actuating force at the weighing scale which is proportioned to but only a small fraction of the downward force exerted on the platform by the weight of the vehicle.

In order to obtain accurate measurements, it is important that the platform during the weighing operation be located directly over the lever system supporting it, without lateral displacement having occurred from the position that it normally has under no load. This condition is not always present, however, during the usual truck weighing. Most weighing platforms are not of such a length as to permit the support of the entire vehicle being weighed. As a consequence, and on the truck being driven onto the platform to prepare the same for the weighing of an axle or a set of axles, due to the manner in which the brakes are applied, and because part of the vehicle is off the platform, displacements will take place extending generally in the path in which the vehicle moves in being positioned on the platform.

A general object of this invention is to provide weighing apparatus for weighing trucks and other vehicles which includes means for detecting when such displacement of the platform has taken place, and signaling to the weighing operator that such has occurred. This enables corrective measures to be taken to eliminate what otherwise would result in an inaccurate reading.

Another object is to provide such apparatus where the means for detecting displacement in the weighing platform comprises a simple and reliable unit readily incorporated with conventional weighing equipment.

The specific apparatus contemplated is relatively maintenance free, and provides a practical and reliable manner for detecting improper platform positioning under operating conditions normally associated with truck weighing scales.

These and other objects and advantages of the invention will become more fully apparent as the following description is read in conjunction with the accompanying drawings, wherein:

FIG. 1 illustrates, in somewhat simplified form and partially diagrammatically, weighing apparatus as constructed according to an embodiment of the invention;

FIG. 2, taken along line 2—2 in FIG. 1, illustrates on a somewhat larger scale, and with portions broken away, a control unit which forms part of a detecting means in the apparatus, and FIG. 3 is a view on the same scale as FIG. 2.

Referring now to the drawings and first of all more particularly to FIG. 1, portions of a vehicle weighing apparatus are illustrated of the type that might form what is known as a weighing station for a highway. The apparatus includes a weighing platform 10 extending over the top of a pit 12 defined by a foundation such as the concrete foundation partially shown at 14.

Drive surfaces 16a and 16b are provided leading up to opposite extremities of the weighing platform, to permit a vehicle to be driven onto the platform incident to the taking weight measurements of its various axles. The path of movement of the vehicular traffic over the platform therefore extends across the page in FIG. 1, as indicated by the double ended arrow indicated by 18. Displacement of the platform, such as would result in an inaccurate reading, might be expected to take place either to the left or to the right in FIG. 1. The particular direction of displacement is dependent on such factors as the direction of travel of the vehicle when approaching the platform, whether backing up was necessary, the manner of brake application, etc.

The weighing platform in the embodiment of the invention illustrated includes a floor 20 mounted on top of beams including such beams as the one shown at 22. The latter is an I beam extending between the extremities 10a, 10b of the platform. The floor and various beams are suitably interconnected in a rigid manner, as would be conventional in any weighing station.

Supporting the platform and located within the pit 12 is a lever system partially shown at 24. The lever system operatively interconnects the platform with a scale or weight indicating means generally shown at 26, used by the operator to measure the load supported on the platform. The particular lever system employed in any given installation may take a number of different forms, and the details of any particular lever system are not believed to be required for the understanding of the particular invention herein disclosed. Suffice it to say that the lever system illustrated includes levers such as the lever 28 pivoted on a fulcrum pivot 30 which is swung vertically, in response to a force being transmitted to the lever by structure 32, on loading of the platform. Lever 28 is connected through additional lever mechanism to weighing scale 26, as indicated diagramatically by the dot-dashed line in 34.

Scale 26 includes the usual scale weighing beam 36 pivotally supported at 38 and provided with weighted means for balancing the beam about its pivot support. The operator adjusts such weighted means on the beam, and through the usual calibrations provided thereon, is enabled to make a weight reading which indicates the weight of the load supported on the platform.

As discussed earlier, displacement of the weighing platform in either of opposite directions extending along the path of the vehicle over the platform may introduce inaccuracies to the readings obtained. For the purpose of signaling whether any such displacement has occurred, this invention contemplates the inclusion of a switch control unit 40, control element or rod 42, and a signaling device such as lamp 44 for detecting such displacement and signaling such to the operator of the weighing apparatus.

Switch control unit 40 (and reference is made to FIG. 3) includes a housing or casing 46 equipped with a hollow fitting 48 at the top of the casing and a conduit connection 58 at the bottom of the casing. Within the casing, and suitably fixed in place, are a pair of switches such as the microswitches 52, 54. Each has a plunger, exemplified by plungers 52a, 54a, for actuating the switch. The switches are connected to conductors 56 which extend out of the casing into conduit 58.

Control rod 42 has its lower end received within the casing and positioned between the plungers 52a, 54a of the switches. The rod is mounted for limited pivotal movement, through an elastomer mounting 62 contained within fitting 48. The mounting, in addition to supporting the control rod for such movement, also serves to seal off the fitting whereby water is prevented from entering into the casing. The upper end of the control rod extends to adjacent a side of one of the I beams in the weighing platform.

The switch control unit through its casing is mounted on a bracket 64 in a suitable location within the pit under the weighing platform.

As can be seen with reference to FIGS. 1 and 2, secured to beam 22 is a bracket 66 including a slot 68. Such slot receives the upper end of the control rod earlier described. The slot is such that movement of the platform from side to side is not transmitted to the control rod. However, with the platform displaced in either of opposite directions extending along the path which vehicles travel over on moving onto the platform, such is transmitted by the bracket to the control rod to cause pivoting thereof. The pivotal movement produces shifting of the lower end of the control rod to cause depression of one of the other at the plungers 52a, 54a, with actuation of the associated switch.

Conductors 56 extend through conduit 58 to a lamp mounting unit 71 which ordinarily would be situated adjacent the weighing scale to be in view of the operator of the apparatus. Lamp 44 is supported in the mounting unit. Power is introduced to the mounting unit through power supply conductors 72.

For the purpose of explanation, it will be assumed that switches 52, 54 are normally open, and connected in the circuit for lamp 44 whereby, when either switch closes, as by depressing its plunger, current is supplied lamp 44 whereby the same illuminates.

It should be obvious that other types of signaling devices could be employed such as a buzzer, etc. Furthermore, the specific electrical connection of the switches could be changed from that specifically described, depending upon whether it is desired that the lamp be normally on or normally off, etc.

It is believed that the operation of the weighing apparatus contemplated should be obvious from the above description. The weighing platform is used in the usual manner to support that part of the vehicle being weighed. The operator of the truck maneuvers his truck until the appropriate axle or set of axles are supported on the platform. The operator of the weighing station utilizes the weighing scales in the usual manner to determine the weight supported on the platform. If the truck driver, through improper use of his brakes or otherwise, has caused displacement of the weighing platform, such as would cause an inaccurate reading, such is signaled to the operator of the weighing station, whereby the condition may be corrected before the weighing is performed.

The control unit and control rod are readily installed under a platform within the pit usually provided in such an installation. Once installed, these constitute a highly reliable and trouble free mechanism for developing a control signal indicative of platform displacement.

While there has been described a specific embodiment of the invention it is obvious that variations and modifications are possible without departing therefrom.

It is claimed and desired to secure by Letters Patent:

1. Vehicle weighing apparatus comprising
   a platform for supporting the vehicle,
   weight indicating means for indicating the measured weight of a vehicle supported on said platform,
   leverage mechanism supporting the platform and interconnecting it with said weight indicating means whereby the indicating means is actuated in response to loading of the platform,
   a control element connected to the platform displaced on shifting of the platform in a direction substantially paralleling the plane thereof, and
   electrical detecting means for detecting displacement of said control element including switch means actuated by displacement of the control element to change the mode of operation of the detecting means.

2. The vehicle weighing apparatus of claim 1, wherein said control element moves in opposite directions on movement of the platform in opposite directions, and said electrical detecting means includes a pair of switches, one of which is actuated with movement of the control element in one direction and one of which is actuated with movement of the control element in the opposite direction.

3. The vehicle weighing apparatus of claim 1, wherein the control element comprises a rod extending downwardly below the platform, the rod is connected to the platform by means whereby movement of the platform in opposite directions along one dimension of the platform is operable to displace the element in opposite directions, and movement of the platform in opposite directions normal to said one platform dimension is isolated from the element.

4. The weighing apparatus of claim 1, wherein said electrical detecting means includes a housing disposed under said platform, said switch means is housed within said housing, said control rod extends from a portion inside said housing positioned to actuate the switch means to a protruding end above said housing, and a member mounted on the platform connects the platform and said protruding end of said rod.

5. Vehicle weighing apparatus comprising
   a platform and drive surfaces leading to opposite extremities of the platform accommodating the driving of a vehicle onto the platform,
   weight indicating means for indicating the measured weight of a vehicle supported on said platform,
   leverage mechanism supporting the platform and interconnecting the platform and said weight indicating means whereby the indicating means is actuated in response to loading of the platform,
   a control element and means connecting the control element to the platform whereby movement of the platform in either of opposite directions extending between said drive surfaces is transformed into displacement of the control element in either of opposite directions,
   a housing and switch means housed within said housing, said housing being disposed adjacent said platform and said control element extending into said housing to an end which is adjacent said switch means, said switch means having a construction whereby the same is actuated with movement of the control element in either of said opposite directions, and an indicator actuated by actuation of said switch means.

* * * * *